United States Patent [19]
Klose

[11] Patent Number: 4,457,580
[45] Date of Patent: Jul. 3, 1984

[54] DISPLAY FOR ELECTRONIC GAMES AND THE LIKE INCLUDING A ROTATING FOCUSING DEVICE

[75] Inventor: George J. Klose, Lomita, Calif.

[73] Assignee: Mattel, Inc., Hawthorne, Calif.

[21] Appl. No.: 469,379

[22] Filed: Feb. 24, 1983

Related U.S. Application Data

[62] Division of Ser. No. 167,569, Jul. 11, 1980, abandoned.

[51] Int. Cl.³ .................. G02B 27/18; G02B 27/14
[52] U.S. Cl. ............................ 350/6.91; 350/6.3; 350/6.8; 340/702; 340/760; 273/1 E
[58] Field of Search ............. 273/1 E, 85 G; 40/446; 340/755, 758, 762, 782, 753, 760, 701, 702; 350/6.4, 6.8, 6.3, 6.7, 6.5, 6.91; 358/205, 206

[56] References Cited

U.S. PATENT DOCUMENTS

| | | | |
|---|---|---|---|
| 3,287,492 | 6/1963 | Milroy | 340/702 |
| 3,568,177 | 3/1971 | Hasler | 340/701 |
| 3,631,461 | 12/1971 | Powell | 340/701 |
| 3,636,837 | 1/1972 | McNaney | 340/755 |
| 3,710,379 | 1/1973 | Bruinsma | 340/702 |
| 4,086,514 | 4/1978 | Havel | 340/762 |
| 4,099,172 | 7/1978 | Montanari et al. | 340/336 |
| 4,160,973 | 7/1979 | Berlin, Jr. | 340/755 |
| 4,413,878 | 11/1983 | Lettington | 350/6.5 |

Primary Examiner—Richard C. Pinkham
Assistant Examiner—Mary Ann Stoll
Attorney, Agent, or Firm—Reagin & King

[57] ABSTRACT

An electro-mechanical display including a rotating focusing device and at least one light source. The position of the focusing device is monitored and the light source turned on under computer control to produce at a viewing position a plurality of light indications from a single source.

1 Claim, 7 Drawing Figures

U.S. Patent  Jul. 3, 1984  4,457,580
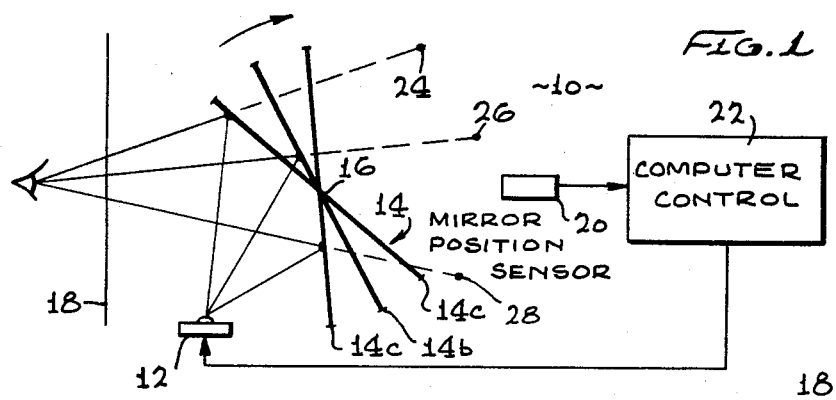
FIG. 1
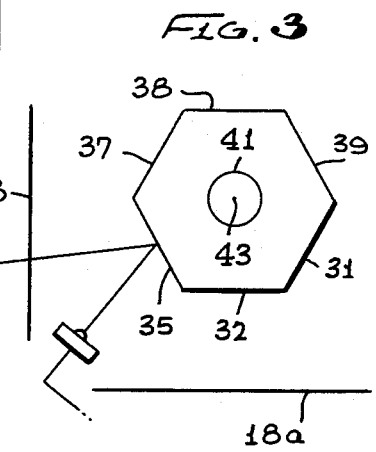
FIG. 3
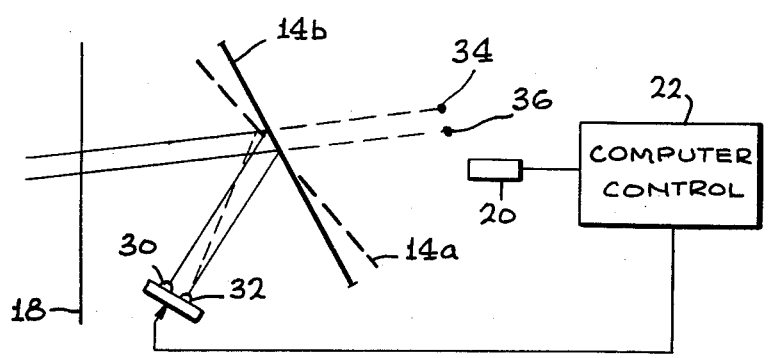
FIG. 2
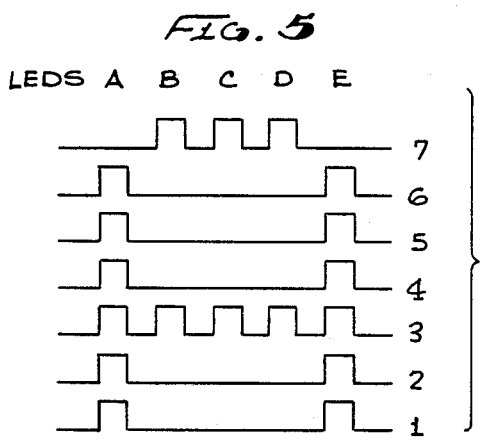
FIG. 5
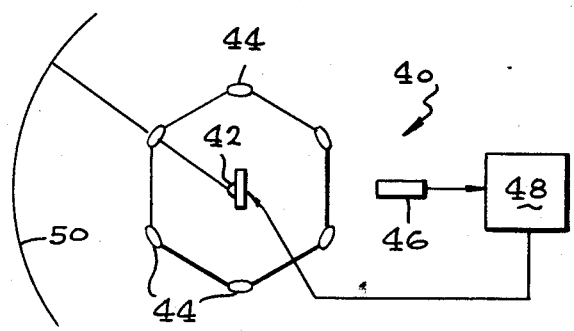
FIG. 4
FIG. 6
| A | B | C | D | E | |
|---|---|---|---|---|---|
|   | + | + | + |   | 7 |
| + |   |   | + |   | 6 |
| + |   |   | + |   | 5 |
| + |   |   | + |   | 4 |
| + | + | + | + | + | 3 |
| + |   |   |   | + | 2 |
| + |   |   |   | + | 1 |
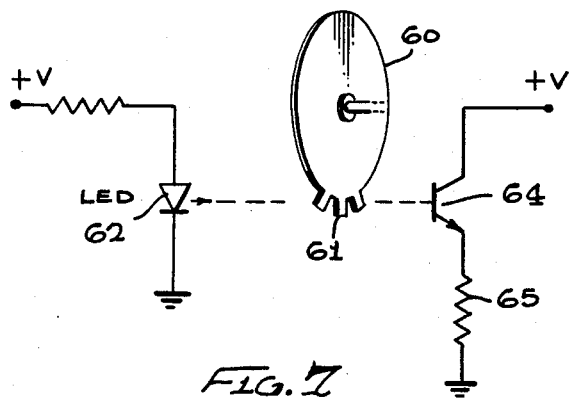
FIG. 7

DISPLAY FOR ELECTRONIC GAMES AND THE LIKE INCLUDING A ROTATING FOCUSING DEVICE

This application is a division of application Ser. No. 167,569 filed July 11, 1980, now abandoned.

BACKGROUND OF THE INVENTION

This invention relates to displays and, more particularly to electro-mechanical displays for electronic games and the like.

There have been a number of displays used with various pieces of electronic equipment in order to provide an output for an operator. The simplest and least expensive of these displays use lights, light emitting diodes, or liquid crystal structures in a matrix pattern to provide outputs. Such devices are used almost entirely for the displays of the portable electronic games. Such devices are able to form but a limited variety of patterns. Cathode ray tubes are utilized when a more sophisticated display is required; a cathode ray tube display is capable of providing almost any planar shape or form. These displays are substantially more expensive than are LED and LCD displays however.

It is an object of the present invention to provide a novel electro-mechanical display capable of describing an unlimited number of different forms.

It is another object of this invention to provide an electro-mechanical display capable of multicolor presentation.

It is another object of this invention to provide an inexpensive electro-mechanical display capable of displaying an almost unlimited number of forms utilizing a plurality of colors.

SUMMARY OF THE INVENTION

The foregoing and other objects of the invention are accomplished by an electro-mechanical display which utilizes one or more rows of light emitting diodes (LEDs) and a rotating focusing device for projecting images of the LEDs to the eye of the observer. A controller is connected to the rotating focusing device and monitors its position so that as the focusing device passes through a number of different positions any selected LED may be turned on and off so that it will appear to the observer in any of a number of positions. In this manner, a single LED may be projected to appear as a line, a series of dots, or may cooperate with other LEDs to form various complicated patterns.

In a preferred embodiment of the invention, two rows of LEDs of red and green colors are used and are intermixed to produce red, yellow, and green colors for the display.

Other objects, features, and advantages of the invention will become apparent by reference to the specification taken in conjunction with the drawings in which like elements are referred to by like reference designations throughout the several views.

BRIEF DESCRIPTION OF THE DRAWINGS

FIG. 1 is a diagram of an electro-mechanical display constructed in accordance with this invention;

FIG. 2 is a diagram of a second display constructed in accordance with this invention;

FIG. 3 is a diagram of another display constructed in accordance with the invention;

FIG. 4 is a diagram of an additional display constructed in accordance with the invention;

FIG. 5 is a graph showing control signals which may be applied to energize the embodiments of the invention shown in FIGS. 1 and 3 in order to cause a particular image to be displayed;

FIG. 6 illustrates a figure displayed when the control pulses of FIG. 5 are applied to the embodiments shown in FIGS. 1 and 3; and FIG. 7 illustrates an arrangement for monitoring the position of a mirror used in the arrangement of FIG. 1.

DESCRIPTION OF THE PREFERRED EMBODIMENT

Referring now to the drawings and, more particularly to FIG. 1, there is shown a diagram of an electro-mechanical display 10 of the present invention. The display 10 includes a row of light emitting diodes 12. The diodes 12 are arranged so that only one is shown because the row continues in a direction perpendicular to the plane of the FIG. 1. A mirror 14 is shown in three positions 14a, 14b, and 14c. The mirror rotates in a clockwise direction about an axis 16 at a constant speed under control of a motor which is not shown. The mirror 14 may have one or two surfaces, although for the point of illustration only a single surface need be considered. A clear screen 18 is positioned to the left of the mirror 14 and an operator may position his eyes behind the screen 18 to view the display 10.

A mirror position sensor 20 monitors the angular position of the mirror 14 and transmits the results of its monitoring function to computer or other control circuitry 22. Using a constant speed motor to rotate the mirror 14, the sensor 20 may indicate when a particulate point on the mirror 14 reaches a particular angle. The control circuitry 22 connects to the LEDs 13 and energizes selected LEDs 12 at selected instants during the rotation of the mirror 14.

In operation, as the mirror 14 rotates, it proceeds through positions 14a, 14b, and 14c. If the computer control 22 energizes an LED 12 at the position 14a, a person behind screen 18 will see (with some latitude for eye movement) an image of the lit LED 12 which appears to be at point 24. As the mirror proceeds to position 14b, the operator will see the same LED 12, apparently at a position 26; and as the mirror proceeds to position 14c, the same LED 12 will appear to be at position 28. If the computer control 22 energizes the particular LED 12 for a very small time with respect to the angle of rotation of the mirror, three dots will appear at positions 24, 26 and 28. The mirror 14 may be rotated at a speed sufficient to allow each point in the display field to be flashed at a sufficient frequency so that the observer will perceive the display field as being continuously illuminated. This will occur because of the persistence of the image on the retina of the human eye. If, on the other hand, the computer control 22 maintains the LED 12 on during the entire period during which the mirror moves from position 14a through position 14b to position 14c, the image of the LED 12 will describe a line proceeding from point 24 through point 28.

Depending on the particular ones of the LEDs 12 energized, various lines and patterns of different exceedingly variable types may be created. For example, FIG. 5 shows a number of control signals which may be applied to a row of LEDs 12 by the computer control circuit 22 to produce a letter A in the manner in which such a letter would be produced by a matrix of LEDs.

One of the advantages of the invention is that a single LED may serve for a row of LEDs and a row LEDs for a matrix. Presuming that the LEDs 12 are designated A, B, C, D, E, respectively, and are positioned apart by equal distances and further presuming that the mirror 14 moves approximately equal angles of rotation from a position 1 through a position 7, the control signals will first turn on LEDs A and E at mirror position 1 to form the bottom of the A shown in FIG. 6. As the mirror 14 proceeds from position 1, the LEDs A and E will be turned off and on again at position 2. At position 3 the LEDs A, B, C, D, and E will be energized to produce the two indications shown in row 3 in FIG. 6. In this manner, the entire A is presented on the display 10 to a viewer viewing through the screen 18 as the mirror 14 passes through the positions 1 through 7.

FIG. 2 shows another embodiment of the invention in which two parallel rows of LEDs 30 and 32 are utilized. The LEDs in row 30 may be presumed to be red in color while those in row 32 may be presumed to be green in color. By selecting one or the other of the colors, a two color display may be presented to a person viewing through screen 18. By superimposing the two colors upon one another, a yellow indication may be displayed. Consequently, the arrangement of only two rows of LEDs 30 and 32 may be used to provide a three color display of matrix or more complicated form.

In utilizing the arrangement of FIG. 2, it will be obvious to those skilled in the art that the timing for energizing an LED in row 30 to cause it to appear in the same position as an LED in row 32 is slightly different. Because the rows 30 and 32 are offset, the diodes in the two rows will appear in offset positions such as 34 and 36 for any one mirror position. Thus, the mirror 14 would have to be at position 14a in FIG. 2 in order for an LED in row 30 to appear in the same position as an LED in row 32 at mirror position 14b. Flashing a red and a green LED to create a yellow spot requires that this timing difference be recognized.

FIG. 3 illustrates another embodiment of the invention in which a number (in this case, six) of mirror surfaces 31, 33, 35, 37, 38, and 39 are rotated by a motor 41 about an axis 43. By this arrangement, the speed of rotation of the motor 41 may be decreased to one-sixth that necessary for a single sided mirror yet will produce the same number of illuminations to an operator behind a screen 18. FIG. 3 also shows an additional screen 18(a) which provides a second viewing positional to which images may be projected by selectively illuminating the LEDs 12 shown therein.

FIG. 4 shows another embodiment by which the invention might be practiced. The arrangement 40 of FIG. 4 has an LED 42 (or a row thereof) positioned within a rotating series of lenses 44. The position of the lens 44 is sensed by a position sensor 46 which furnishes this position information to a computer control circuit 48. The control circuit 48 furnishes on-off signals for operating the LED 42. At a particular position of a lens 44 as it passes in front of a lit LED 42, the lens 44 projects the image of the LED 42 on a screen 50 at the angular position during which the LED 42 is turned on.

As with the other embodiments, an LED may describe a number of individual positions or a line depending on the control signals furnished by the computer controller 48.

FIG. 7 illustrates a sensing arrangement which may be used with the invention (for example, as sensor 20 of FIG. 1) in order to determine the position of the rotating mirror or mirrors utilized. The arrangement includes a gear 60 which is coupled to rotate with the mirror 14 of FIG. 1. The gear 60 has teeth 61 along its edge at selected angular intervals appropriate to the angular change of the mirror 14 desired to be monitored. As the gear 60 rotates with the mirror, the teeth 61 interrupt light from an LED 62 which is connected to ground and to a positive voltage through a resistor 63. The switching of the light is detected by a phototransistor 64 which has its emitter grounded by a resistor 65 and its collector connector to a source of voltage. The transistor 64 switches on and off with light changes. Voltage changes across the resistor 65 provide input signals for monitoring the position of the mirror 14.

Other methods such as magnetics in the mirrors and coils providing signals to the computer control 22 or reflective sensors such as photo-transistor 64 arranged to detect light from the LEDs 12 at a particular point in the rotation of the mirror might also be utilized.

It should be understood that various other arrangements of the invention might be devised by those skilled in the art without departing from the teaching thereof. For example, the motor driving the mirror 14 shown in FIG. 1 need not be a constant speed motor but might be controlled by servomechanical or other means so long as the position of the focusing devices is precisely known by the control circuit 22 so that images of the LEDs 12 may be displayed at appropriate positions to the viewer positioned behind the screen 18. Thus, while there have been shown and described preferred embodiments, it is to be understood that various other adaptations and modifications may be made which fall within the spirit and scope of the invention.

What is claimed is:

1. A display comprising a mirror, means for rotating the mirror about an axis, position means for determining the angular position of the mirror, first and second light sources designed to radiate light of first and second primary colors, respectively, the light sources positioned adjacent each other in a line perpendicular to the axis of rotation of the mirror, each light source being oriented to radiate light onto a surface of the mirror, from where the light is reflected onto a focusing plane at a point which is a function of the angular position of the mirror, and control means operatively connected to the light sources and responsive to the position means for energizing the first and second light sources at peredetermined angular positions of the mirror to cause the light from both the first and second light sources to appear at the same point on the focusing plane to produce an image having a third color.

* * * * *